United States Patent [19]

Perlman et al.

[11] Patent Number: 4,641,263

[45] Date of Patent: Feb. 3, 1987

[54] CONTROLLER SYSTEM FOR EMULATING LOCAL PARALLEL MINICOMPUTER/PRINTER INTERFACE AND TRANSFERRING SERIAL DATA TO REMOTE LINE PRINTER

[75] Inventors: Eugene H. Perlman, Bedford, N.Y.; Laurence MacNaughton, III, Hampton, Conn.; Thomas Loucas, Riverside, Conn.

[73] Assignee: Digital Associates Corporation, Bridgeport, Conn.

[21] Appl. No.: 618,994

[22] Filed: Jun. 11, 1984

Related U.S. Application Data

[63] Continuation of Ser. No. 378,793, May 17, 1982, abandoned.

[51] Int. Cl.⁴ .................. G06F 3/12; G06F 3/023; G06F 11/10; G06F 15/16
[52] U.S. Cl. .................... 364/900; 364/519
[58] Field of Search ... 364/200 MS File, 900 MS File, 364/519; 178/23 A, 23 R, 30, 42; 340/825.05-825.08; 371/32, 33; 400/61, 62

[56] References Cited

U.S. PATENT DOCUMENTS

| | | | |
|---|---|---|---|
| 3,711,646 | 1/1973 | Vermilion et al. | 178/25 |
| 3,879,577 | 2/1975 | Progler | 178/23 A |
| 4,028,669 | 6/1977 | Higashide | 364/900 |
| 4,048,625 | 9/1977 | Harris, Jr. et al. | 364/900 |
| 4,082,922 | 4/1978 | Chu | 179/15 BA |
| 4,092,714 | 5/1978 | Norton et al. | 364/200 |
| 4,096,578 | 6/1978 | Malkemes | 364/900 |
| 4,125,874 | 11/1978 | Higashide et al. | 364/900 |
| 4,137,425 | 1/1979 | Ferroglio et al. | 178/30 |
| 4,152,582 | 5/1979 | Schippers | 235/310 |
| 4,386,416 | 5/1983 | Giltner et al. | 364/900 |
| 4,390,947 | 6/1983 | Deshon | 364/200 |
| 4,392,197 | 7/1983 | Couper et al. | 364/200 |
| 4,405,978 | 9/1983 | Lange et al. | 364/200 |
| 4,426,166 | 1/1984 | Bowling | 400/62 |
| 4,439,859 | 3/1984 | Donnan | 371/32 |
| 4,453,211 | 6/1984 | Askinazi et al. | 364/200 |
| 4,454,575 | 6/1984 | Bushaw et al. | 364/200 |
| 4,514,823 | 4/1985 | Mendelson et al. | 364/900 |

OTHER PUBLICATIONS

"Smart Interface Adds Control Functions to Daisy-Wheel Printers", Electronics, (vol. 28, No. 10, Jun. 19, 1980), pp. 41-42.

D. O. Hays et al., "Standard Printer or I/O Adapter Control Method & Apparatus", IBM Tech. Disclos. Bulletin (vol. 22, No. 1, Jun. 1979), pp. 269-271.

MNTL Logic Laboratories, Inc., *DGP-64 Remote Printer Transmitter* ("Installation Manual"), date uncertain, pp. 1-7.

*Microprocessor Controlled Printer System Emulates DEC-20 Controller*, Computer Design (Sep. 1980), vol. 19, No. 9, p. 68.

U. Klein, *Programmed Printer Controller SMP-E 355 and -E 356*, Siemens Components (Jul. 1980), vol. 15, No. 3, pp. 139-143.

Primary Examiner—Archie E. Williams, Jr.
Attorney, Agent, or Firm—S. C. Yuter

[57] ABSTRACT

A remote line printer system is used for printing on a line-by-line printer at a remote location. Data stored in a minicomputer and fed in parallel format from a print port. The minicomputer, which thinks it is driving a local printer, is connected to a microprocessor controlled transmitter which emulates the conventional minicomputer/printer interface. The transmitter includes a serializer which converts character data from parallel to serial for transmission serially to a microprocessor controlled remote receiver via a communications line. At the receiver a deserializer converts serial data into parallel format for printing by a line printer which thinks it is being driven by a local host computer. The system includes retransmission of data in case of error as well as compression of data before transmission and decompression of data before printing.

8 Claims, 10 Drawing Figures

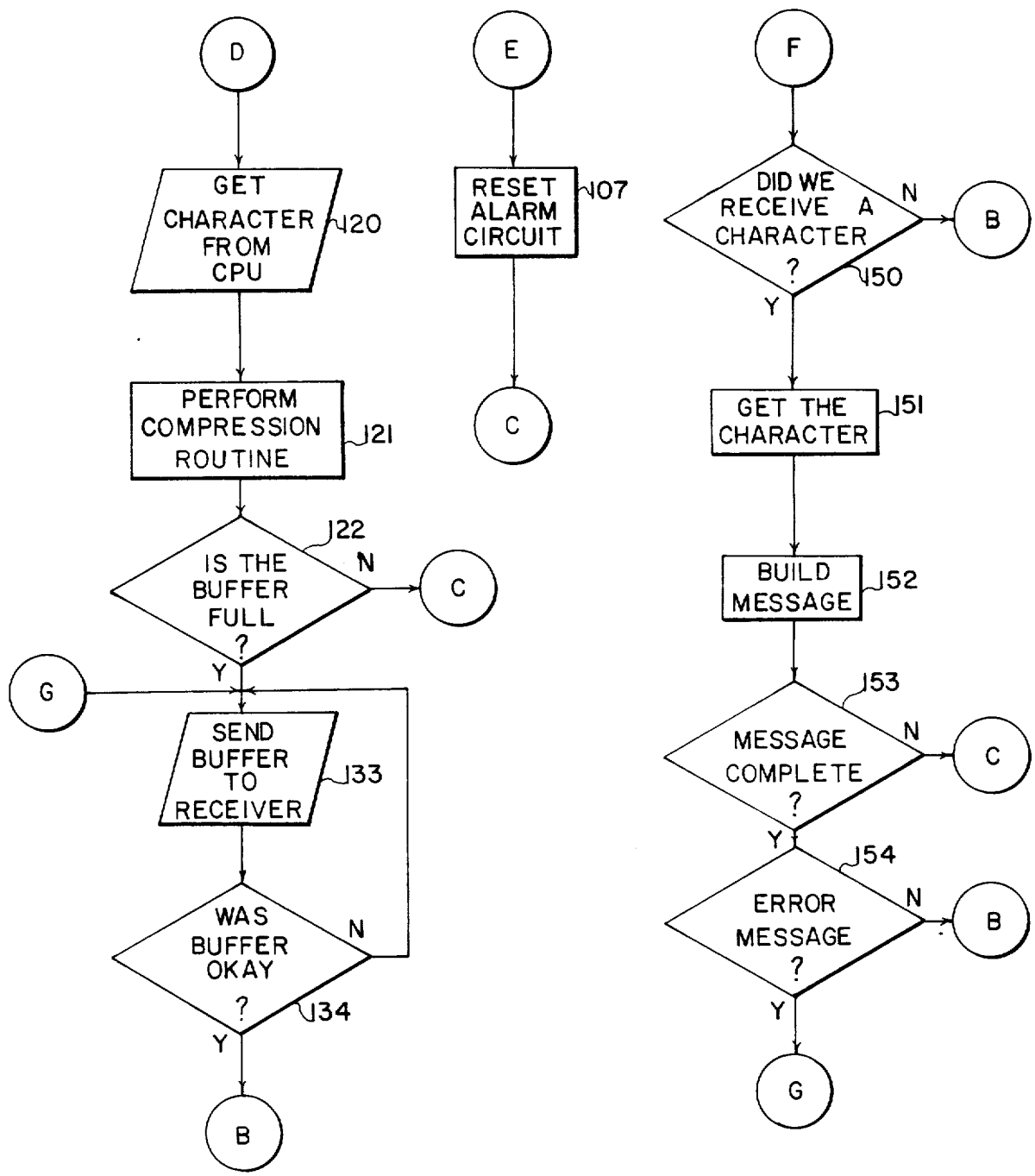

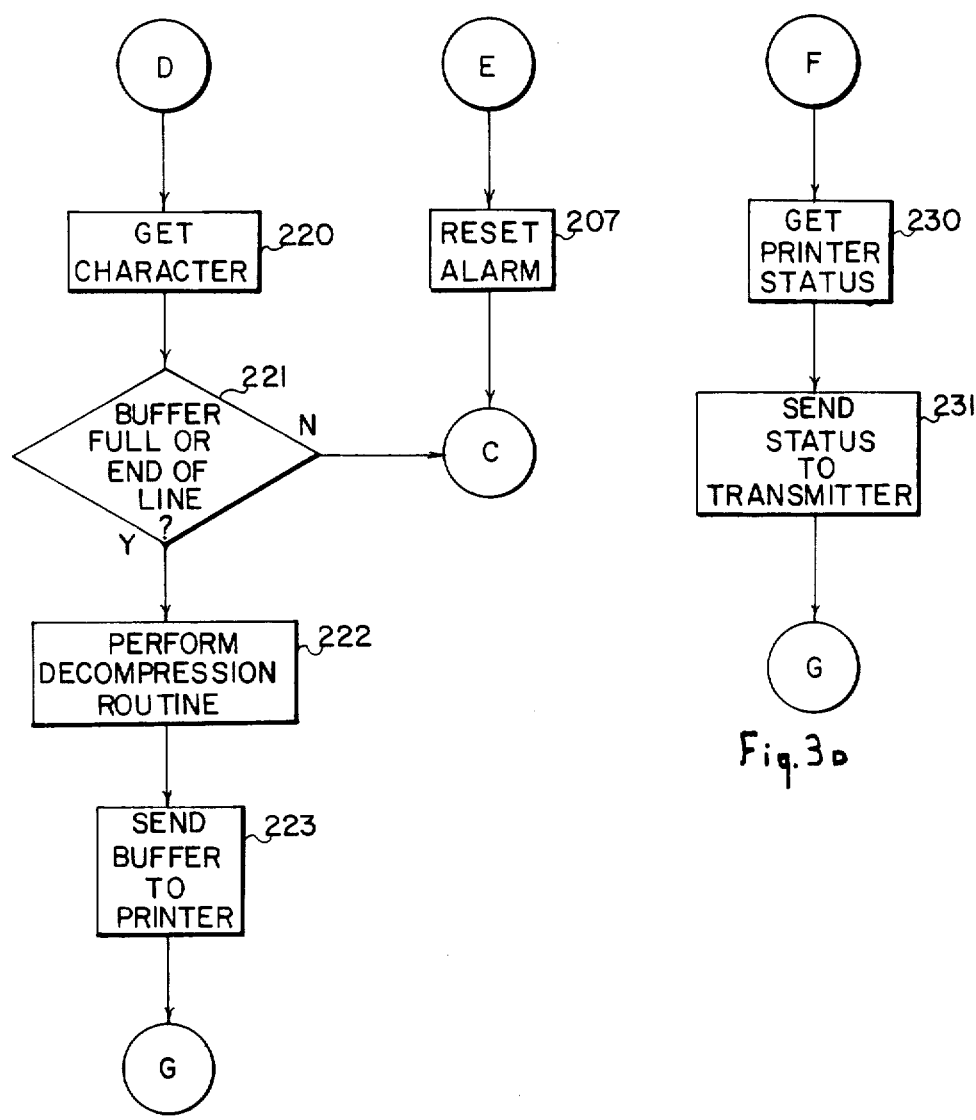

RECEIVER 160

CONTROLLER SYSTEM FOR EMULATING LOCAL PARALLEL MINICOMPUTER/PRINTER INTERFACE AND TRANSFERRING SERIAL DATA TO REMOTE LINE PRINTER

This is a continuation of application Ser. No. 06/378,793 filed May 17, 1982, now abandoned.

This invention relates to distributing computer-generated data to a remote location and, more particularly, to printing such data at a remote location.

BACKGROUND OF THE INVENTION

Heretofore, computer-generated data has been distributed to a remote location in two ways. The first approach is to print reports at the central computer site and ship them to a remote location. The second way is to install a serial printer at the remote site. If the central computer is a minicomputer then the data is taken from its communications port serially and transmitted to the remote serial printer. The use of a serial printer eliminates the manpower and associated costs in packing and shipping voluminous reports. But driving a remote serial printer from the communications port of a minicomputer partially diverts it from other tasks because every bit must be sensed before it is transmitted. Moreover, with a growing trend toward increased printing at remote locations, serial printers are being pushed beyond their duty cycles with an increased risk of printer breakdown. Further, serial printers are relatively slow compared to line-by-line printers.

SUMMARY OF THE INVENTION

The general object of the invention is to provide an improved system for distributing computer-generated data to a remote location.

A specific object of the invention is to transmit minicomputer-generated data to a remote location without unnecessarily diverting the minicomputer from other tasks.

Another object of the invention is to increase the speed and reliability of printing minicomputer-generated data at a remote location.

Briefly, in accordance with the invention, a remote line printer system is provided for printing on a line-by-line printer at a remote location data stored in a minicomputer having a print port at which bits of a character to be printed locally appear in parallel. The system comprises a parallel-to-serial converter coupled to the print port (and not to any communications port) for converting character data at the print port from parallel to serial representation. Communications means, coupled to the parallel-to-serial converter transmit the character data serially to the remote location where a serial-to-parallel converter converts the serial data to parallel representation. A line printer then stores the parallel-represented characters and prints them line by line.

The major advantages of the invention as compared with a remote serial printer operating through the communications port are: increased system throughput; substantial reductions in transmission time, and increased accuracy of transmitted data. The invention assumes the burden of communications protocol/overhead formerly placed on the host minicomputer processor while accepting data from the central processor unit in the more efficient parallel mode rather than in the serial mode. The result is the elimination of processor degradation that occurs when a high-speed line printer is driven off the communications port. Data compression and block mode transmission improve throughput speeds and provide substantial savings in line use charges.

Another advantage of the invention is that error detection and correction as well as data compression, and transmission in a block mode may readily be added at a relatively small incremental cost to the basic system. With error detection and correction as part of the system, less expensive modems may be used at a substantial saving in equipment.

Another advantage flows from operation off the print port rather than the communications port; plug compatibility with a broad range of minicomputers without modification of existing hardware, software or operating systems. In fact, the invention eliminates the need for a communications operating system to drive a remote printer, and even eliminates the need for a communications port.

Because the invention uses fewer minicomputer cycles it improves minicomputer utilization. And since a line printer instead of a serial printer is employed, the printer is more reliable and operates with significantly higher speed.

BRIEF DESCRIPTION OF THE DRAWINGS

Other objects, advantages and features of the invention will be apparent from the following description of the preferred embodiment of the invention together with the accompanying drawings in which:

FIGS. 2A–2D is a flow chart of the program for the transmitter;

FIGS. 3A–3D is a flow chart of the program for the receiver;

Figure 1:
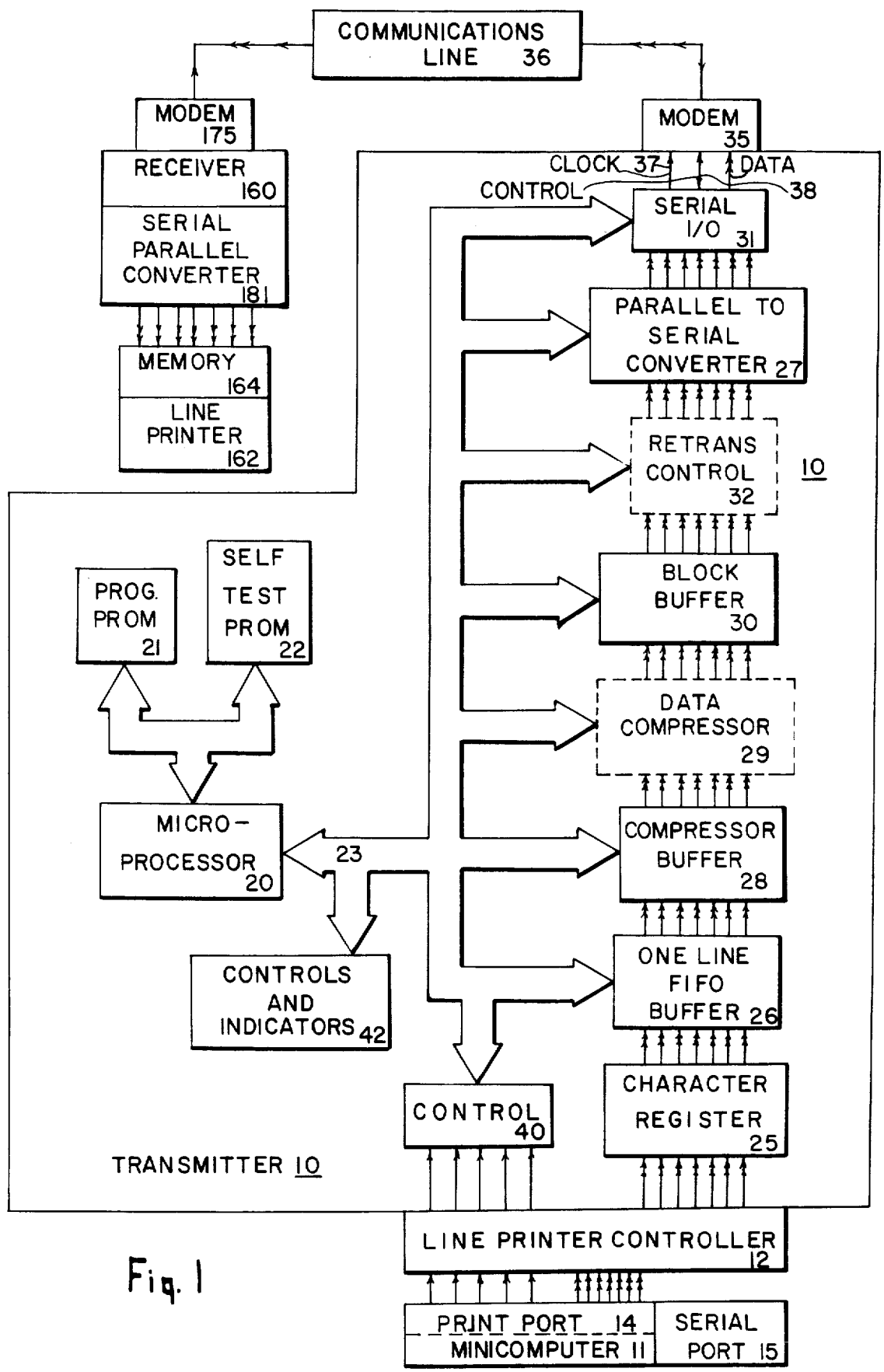
FIG. 1 is a block diagram of the remote line printer system invention showing the transmitter in detail and the receiver as a single block.

It should be noted that blocks of the drawing in dash-dash outline represent software modules, double-headed arrows represent data flow and single-headed arrows represent control signals.

Referring now to the drawings and more particularly to FIG. 1, the transmitter 10 in accordance with the preferred embodiment of the invention is adapted to be coupled to the print (parallel) port 14 of a conventional minicomputer 11; for example, by way of a conventional line printer controller 12 and without modification of the line printer controller 12. The transmitter 10 is not coupled to any serial port 15 of the minicomputer 11. In fact, no serial port is required when the invention is employed.

The transmitter 10 is preferably software controlled, and for this purpose includes a conventional microprocessor 20 with program memory; for example, PROM 21 having programs for operation of the transmitter and PROM 22 serving for self-testing the system.

The microprocessor 20 is coupled by conventional bus structure 23, including bus lines conveying control, data and address signals, to the remainder of the active components of the transmitter 10.

Parallel data signals from the line printer controller 12 are applied to a character register 25 and thence, under control of the microprocessor 20, are stored in a one-line FIFO buffer 26. The parallel data output of buffer 28 is applied to a compressor buffer 28 and data compressor 29 in order to reduce the transmission of iteration of the same characters. For example, a 2-character control and space-count code may be substituted for any sequence of three or more spaces or repeated characters, such as zeroes, between printable characters within a print line. It has been found that this compression may result in reduction of up to 30 precent in transmission costs as a result of the reduction of time required for transmission of messages.

The compressed data is stored in a block buffer 30 for application to the serial I/O 31 by way of a retransmission control circuit 32 and a preprogrammed parallel-to-serial converter 27. The block buffer 30 and compressor buffer 28 has a storage capacity enabling the storage of data until correct transmission has been verified, either by acknowledgement from the receiver 160 of a correct transmission or the absence of a request from the receiver 160 for retransmission. The output of the serial I/O 31, including data, clock and control lines, is connected to the modem 35 for transmission via the communications line 36 and modem 175 to receiver 160. The clock line 37 enables, for example, synchronization of the transmitter 10 and receiver 160. The control line 38 enables transmission and reception of control signals, such as, for example, clear-to-send and request-for-retransmission signals. The control and clock signals may of course advantageously be transmitted in serial form with the data signals, under the control of the microprocessor 20. Control 40 aids in control of the transmitter 10 which also includes controls and indicators 42.

Parallel data from receiver 160 is printed line-by-line by line printer 162, via memory 164. Receiver 160, hereinafter described in detail, includes a preprogrammed serial-to-parallel converter 181.

Referring now to FIGS. 2A–2D, therein is illustrated a flow diagram of the operation of the transmitter 10. Initially, upon starting this system, the transmitter 10 is initialized at 100 to run a self-test to insure that it is capable of communicating with all of its internal components. This initialization may also test the memory in the transmitter 10.

Upon initialization, the transmitter sends a sign-on signal to the receiver 160 at 101. The receiver 160 must respond to the transmitter with a message indicating that it is in synchronism with the transmitter 10. If the receiver 160 is not in synchronism, the program loops back to attempt to obtain a synchronization signal again at 99. When the proper sign-on has been determined, the CPU (i.e. the minicomputer 11) is signalled that the printer 162 is on line at 102. If there is no data that is to be sent to the printer 162 at that time, the transmitter 10 sends idle messages to the receiver 160 at 103, and the receiver 160 acknowledges these messages. This maintains the transmitter 10 and receiver 160 in synchronization, until any interrupt signal is received that controls a further operation of the transmitter 10. Thus, at 104, if a signal has occurred, the program proceeds to determine the source of the signal. For example, if the signal had originated in the CPU indicating the requirement for handling data originating in the CPU, at 105, the program branches to the transmission routine in FIG. 2C. If the signal was not a CPU interrupt, but was an alarm signal, as indicated at 106, the program branches to the reset alarm subroutine 107 in FIG. 2C. In a further test, at block 108 the transmitter 10 checks to see if the signal came from the receiver communications port 15. If it did, the transmitter 10 proceeds to the routine in FIG. 2D that handles data from the receiver 160.

If none of the above types of signals had occurred, the signal must have been a spurious signal. The program ignores such a spurious signal, and maintains a tight loop while updating any displays provided in the transmitter 10, waiting for a further signal at 111 to branch back to determine the source of the signal.

Referring now to FIG. 2C, when the CPU has signalled the presence of data to be transmitted, at block 120, the character is obtained from the CPU and, at block 121, a check is made to determine the occurrance of identical consecutive characters. If, for example, there are three or more consecutive identical characters the transmitter 10 may be programmed to compress them into a 3-character sequence as above-discussed. A test is then made at block 122 to determine if the block buffer 30 is full. If it is not full the program branches back to update the display and wait for a further signal as shown in FIG. 2B. If the block buffer 30 is full, however, the program effects the transmission thereof to the receiver 160, at block 133. If the receiver 160 acknowledges the correct transmission, or alternatively, does not signal an incorrect transmission, the program branches back to wait for another signal. Upon incorrect transmission, however, at block 134, the program branches back to retransmit the data at block 133.

Figure 2A:
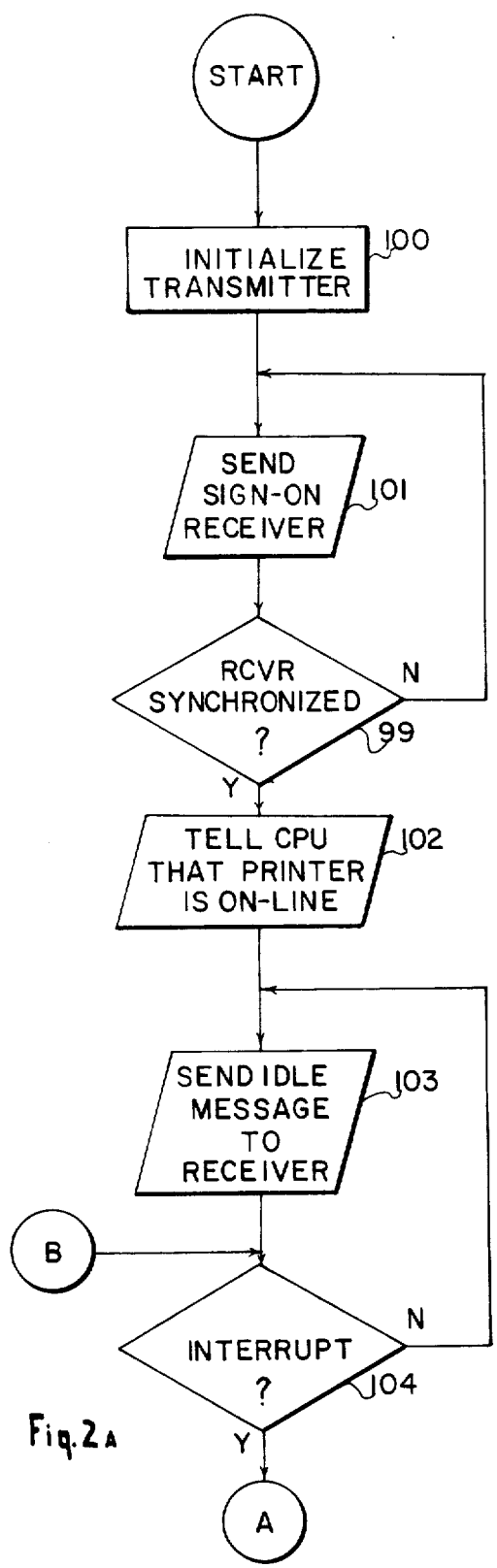
Figure 2B:
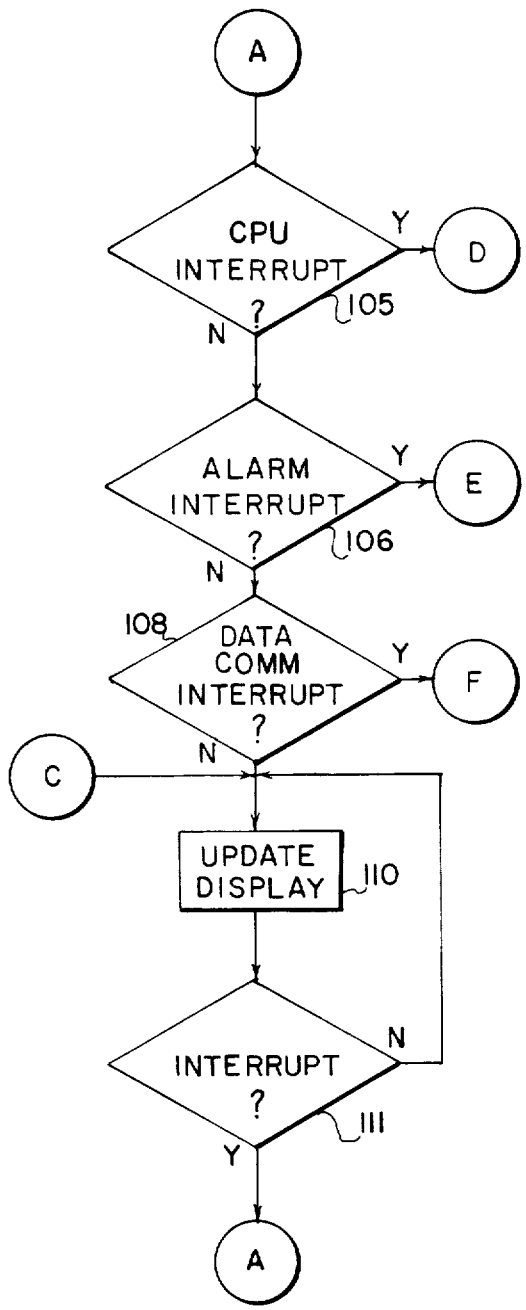

If the signal had arisen from the communications port in the receiver 160, as indicated at block 108 in FIG. 2B, the transmitter proceeds to the subroutine of FIG. 2D that handles data from the receiver 160. Referring to FIG. 2D, the character received is first tested at block 150 to determine if a character was actually received. If the character was spurious, the program branches back to block 104 to await a further signal. Upon the reception of a correct character, however, this character is received at block 151. The characters that are received are parts of a message from the receiver 160 that indicates whether the last block transmitted from the transmitter was good or bad. These characters are received one at a time until the message is complete, the message being formed at block 152. If the message is incomplete, the test at block 153 glances back to receive a further character. When the message is complete, it is tested at block 154 to determine whether or not the transmitted message had been correct. If it is incorrect, the program branches to block 133 to retransmit the message. If the message had been transmitted correctly, the program branches back to FIG. 2A to await a further signal.

Figure 4:
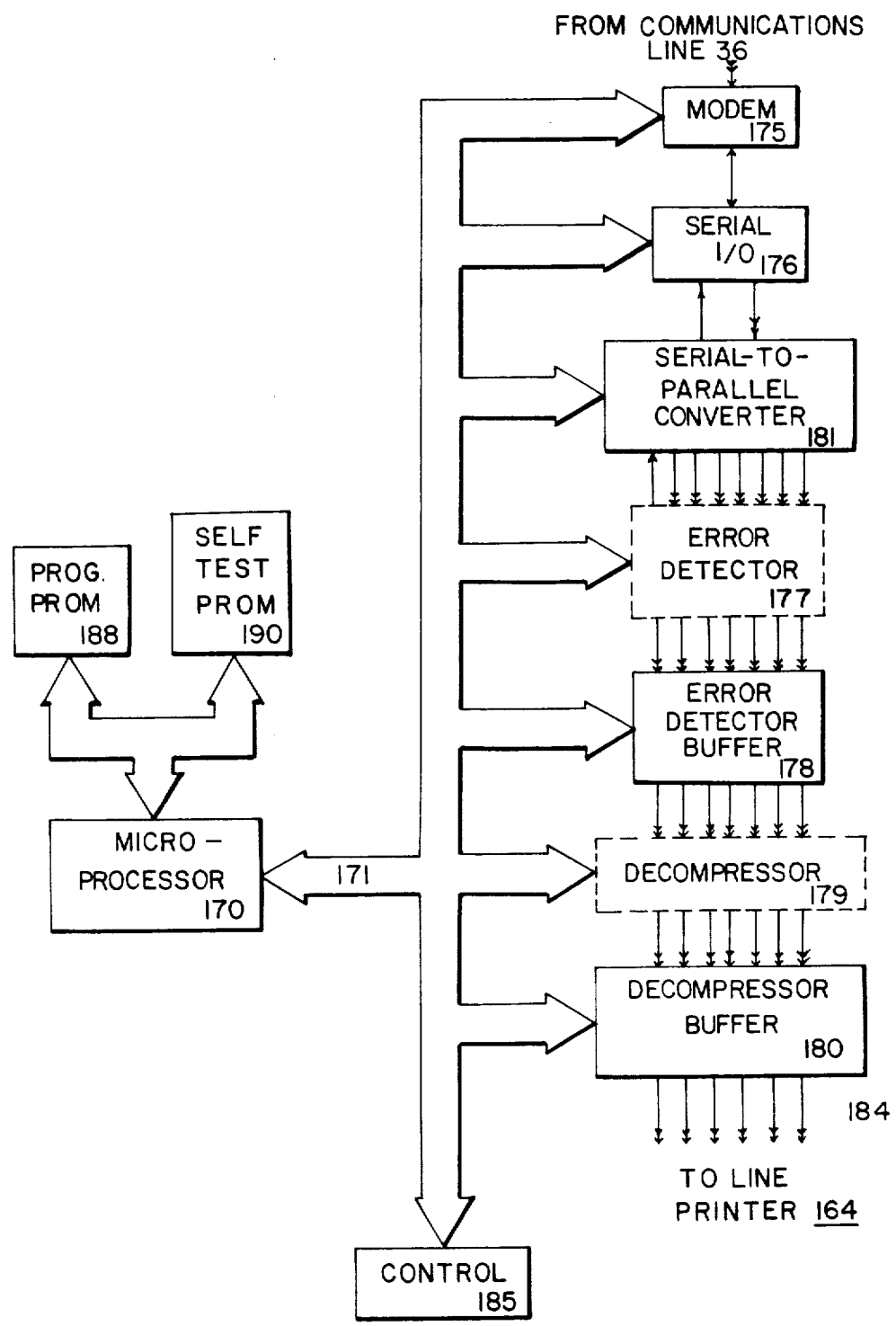
FIG. 4 is a block diagram showing the receiver of FIG. 1 in greater detail.

The receiver 160 may be formed in a manner similar to that of the transmitter, and one embodiment of the receiver 160 is illustrated in the block diagram of FIG. 4. The receiver 160 is also preferably software controlled by a microprocessor 170. The microprocessor 170 controls the remainder of the componenets of the system, for example by way of a bus 171 including data, address and control lines.

The serial signals received from the communications line 36 at modem 175 are received at the serial I/O 176 where they are converted to parallel signals by a preprogrammed serial-to-parallel converter 181. The thus received signals are tested for the presence of errors, such as, for example, parity errors, in the error detector 177 and associated error detector buffer 178. If an error is detected, under the control of the microprocessor 170, an error message is returned to the modem 175 by way of the converter 181 and serial I/O 176. A correctly received message is stored in the decompressor buffer 180, for decompression by decompressor 179 according to the rules applied in the compression of the signals in the transmitter 10. The decompressed data stored in decompressor buffer 180 is in parallel form for application to a conventional memory 164 of conventional line-by-line parallel input printer 162 coupled to the output leads 184. Suitable control signals may also be applied to the printer 162 by way of the control 185, under the program control of the microprocessor 170. Microprocessor 170 also includes program PROM 188 and self test PROM 190.

Figure 3A:
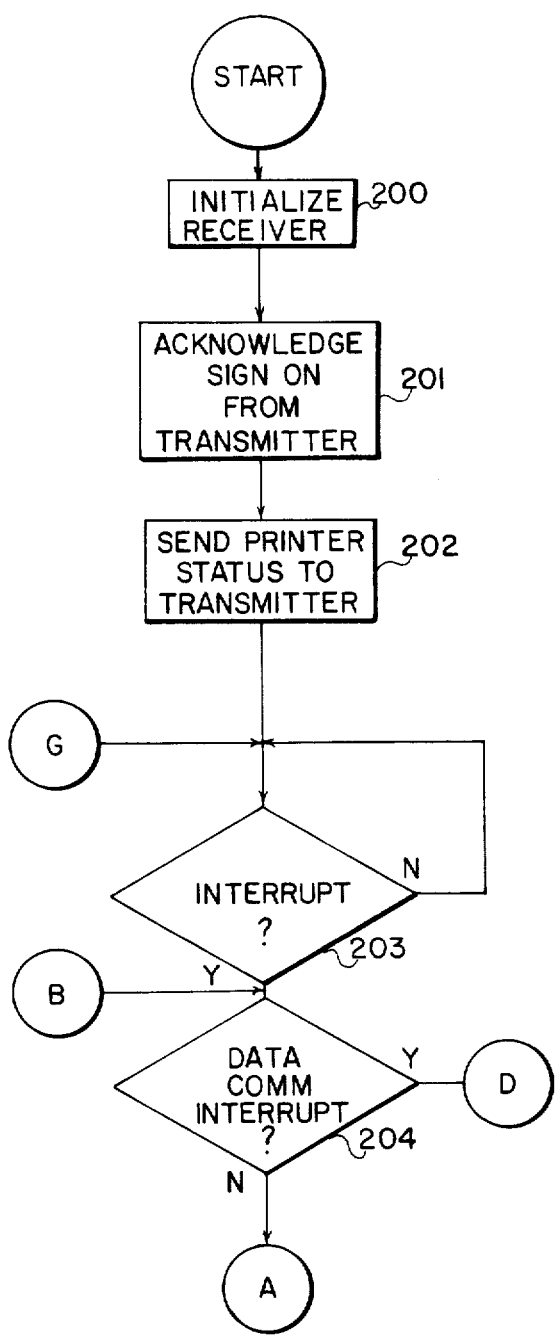
Figure 3B:
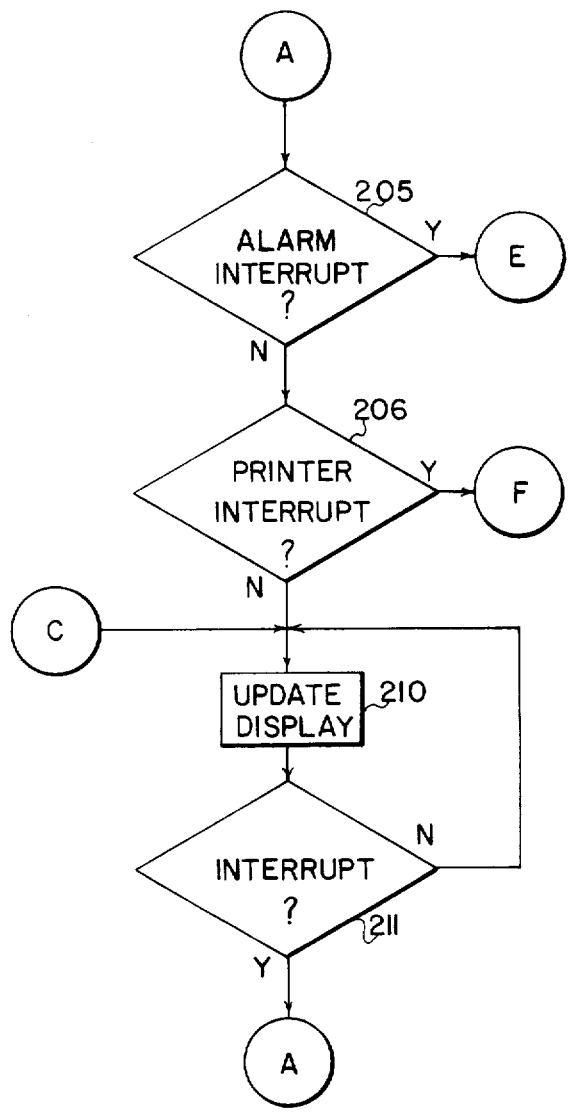

The operation of the receiver is more clearly shown in the flow diagrams of FIGS. 3A–3D. As illustrated in FIG. 3A, upon starting the system the receiver 160 is initialized at block 200 to run through a self-test routine that tests to make certain that the microprocessor 170 can communicate with its internal components. Upon the receipt of an acknowledgement signal from the transmitter 10, at block 201, the receiver 160 sends a signal at block 202 to the transmitter 10 concerning the on-line and ready status of the printer 162. This data is sent to the transmitter 10 every time the status of the printer 162 changes.

The receiver 160 now waits for a signal at block 203. If an interrupt has originated at the data communications port 15 of the transmitter 10, then, at block 204, the program branches to the printing routine of FIG. 3C. If an alarm signal had been received, at block 205, the program jumps to the alarm resetting subroutine of FIG. 3C. If a printer signal had been received, i.e. indicating that there was a change in the status of the printer 162 and that a new status signal must be sent to the transmitter 10, the program branches from block 206 to the subroutine at FIG. 3D. If the signal has not been identified, it is probably spurious, and hence the display is updated at block 210, and the program searches for a further interrupt at block 111, looping back to block 210 if no interrupt is received and looping back to block 204 in the event a signal is received.

In the print routine, as illustrated in FIG. 3C, the character is first received from the modem 175 at block 220 and stored in the error detector buffer 178. The error detection and signal return steps have of course been performed immediately prior to this storage. If the buffer 178 is full, as tested at block 221, the decompression routine is performed at block 222, and the resultant decompressed data is sent from the buffer 180 to the printer 162, at block 223. The program then loops back to block 203 to test for the next signal.

In the subroutine responding to an interrupt from the printer 162, as illustrated in FIG. 3D, the subroutine obtains the status of the printer at block 230, and transmits this status to the transmitter 10, at block 231.

In one embodiment of the invention, the microprocessors of the transmitter 10 and receiver 162 are of the type 6802, and the PROMS of the transmitter 10 and the receiver 162 are of the type 2708. The conventional line printer controller 12 may be a conventional interface of a conventional line printer; for example, the interface of a Dataproducts Corporation Model B-600 Line Printer. Thus line printer controller 12 emulates the interface between a conventional minicomputer and a local line printer.

The following message format has been employed satisfactorily for the blocks of data transmitted between the transmitter and receiver:

TRANSMIT MESSAGE FORMAT

Inter-system messages have the following format:
SYN SYN SYN SYN SOH SC AC OC STX LC (Text ... Text) ETX BCC

SYNCHRONIZATION FIELD (SYN)

The synchronization field (SYN) has four identical 7-bit (plus odd parity) bytes having a bit configuration of P0010110. These characters are used to synchronize receipt of the message.

HEADER FIELD (SOH)

The header field is indicated by the start of header (SOH) code. The header field contains a sequence code, an address code, and an operation code. The SOH code has a bit configuration P0000001.

SEQUENCE CODE (SC)

The SC is used to identify a message being retransmitted. This code counts from P0000000 to P11111111.

ADDRESS CODE (AC)

(Unassigned)

OPERATION CODE (OC)

The OC selects different operations of the RECEIVER. When the OC has a bit configuration of P1000000, data in the text field is to be printed.

When the OC has a bit configuration of P1000100, the RECEIVER is initialized.

The next SC transmitted must be P1000000.

The RECEIVER must acknowledge the initialized message.

START OF TEXT (STX)

The STX code has a bit configuration of P0000010. This code is used to indicate the start of the text to be printed.

LC

MOD 128 (Last 7 Bits of Length Count)

TEXT CODE (TEXT)

The text code represents the actual information to be printed, RS and RCC, and may contain up to 448 characters, including both data and control characters. The text code format is as follows: . . . (DATA) RS RCC .

DATA

The data is the actual information to be printed and may include compressed characters.

During periods of no transmission, the System Status is verified by transmitting idle message and Receiving ACKS for them.

The Period between Idles is Switch Selectable at 6 sec. or 1 min. intervals.

RECORD SEPARATOR CODE (RS)

The RS code is used to indicate the end of data for the record. It has a bit configuration of P0011110.

RECORD CHECK CHARACTER (RCC)

The RCC is a 7 bit (plus odd parity) longitudinal check code reflecting the transmission status of the record. Calculation of the RCC starts after the STX and continues through the RS code, and then inserted after the RS code. Calculation of this character is made from the 7 bits of the codes involved and does not include the parity bit. Odd parity is added to the RCC code just as it is added to all other codes.

END OF TEXT CODE (ETX)

The ETX code has the bit configuration P0000011. This code is used to indicate the end text of the message being transmitted.

BLOCK CHECK CHARACTER (BCC)

The BCC is a modulo 2 sum of all characters, starting with SC through ETX. The BCC calculation is made from the 7 bits of the codes involved (not including the parity bit) in the same manner as the RCC code. Odd parity is added to the BCC code just as it is added to other codes.

RECEIVER MESSAGES

Are messages moving from the receiver to the transmitter. There are messages in two classifications which can be sent to the transmitter, these are:
Acknowledgement Messages Status (ACK)
Select Messages Receiver messages are sent at one of the two, communication link, dependent times.

In a Half Duplex environment the Receiver messages may only be sent between Data Blocks or Idle Blocks In a Full Duplex environment a Receiver message may be sent at any time, but will not be acted upon by the transmitter until it reaches the end of a block of data or idle.

The format for Receive Messages is:
SYN SYN SYN SYN SOH AC OC STX ETX BCC

These codes are described in the transmitter message discussion. When an acknowledgement message is being transmitted to the TRANSMITTER, the OC has a bit configuration of P1xxxyyz; where xxx and yyz have the following meanings:

| xxx | yyz | MEANING |
|---|---|---|
| 000 | 00z | Positive acknowledgement (ACK). No errors receiving data. Printer status as follows: |
| 000 | 11z | Printer READY and ON-LINE |
| 000 | 01z | Printer not READY, but ON-LINE |
| 000 | 00z | Printer neither READY nor ON-LINE |
| 000 | 10z | Printer READY but not ON-LINE |
| Z = 1 For Select Message | | |
| 0 For ACK Message | | | xxx=001 Negative acknowledgement (NAK). Error detected while receiving for one or more of the following reasons:

| 001 | 001 | 1. RCC or BCC error |
|---|---|---|
| 001 | 010 | 2. Character parity error |
| 001 | 100 | 3. Unrecognizable format |
| 100 | 000 | Sequence code (SC) error. |

The system in accordance with the invention, by employing the parallel print port 16 of a minicomputer 11, enables the transmission of data at a much more rapid rate than possible when employing the serial port 15. As a consequence, the time of operation of the minicomputer 11 required for data transmission to the printer 162 is minimized, such that the minicomputer operation time may be more economically employed. The parallel output form is not suitable, however, for transmission directly to a remote printer. In accordance with the invention, however, a transmitter 10 interface is provided at the minicomputer 11 for interconnection by way of a modem 35 to the communications line 36 and a receiving interface is provided at the printer 162 for receiving serial data from the communication line 36 by way of a modem 175 and receiver 162. The transmitter interface, by converting the data to serial form, enables communication by way of the serial communications line 36. An advantage is obtained, however, as compared with use of the serial port 15 of the minicomputer 11, in that the minicomputer 11 no longer must continually control the transmission. The use of a separate transmitter interface additionally enables the compression of the signals in a simple manner, to reduce the time necessary for the transmission of messages. Further, the transmitter interface may be provided, in a simple manner, with means for retransmitting messages that had not been correctly received at the receiver interface.

The receiver interface provides all of the necessary signals for the printer 162, without modification of the printer 162, as well as serving the additional functions of detecting the receipt of erroneous messages, and decompressing the received data to be in a form suitable for direct printing on the line-by-line printer 162.

In one comparison of the system of the invention with a system employing the serial RS 232 port of a minicomputer, the system of the invention was found to improve system throughput by about 50%, and improve the efficiency of the minicomputer by about 30% without requiring modification of the software or hardware of the minicomputer. The type 6802 microprocessors, with a total of 4 kilobytes of memory, not only control the serial to parallel and parallel-to-serial conversion, but also are employed to control the data compression and automatic error detection.

The provision of the automatic error detection features is of course not readily possible when a serial RS 232 port of the minicomputer is employed, without substantial modification of the minicomputer programs and a resultant decrease in efficiency of operation of the minicomputer.

The modems may operate at transmission speeds of, for example, 2400, 4800 or 9600 band.

In the program for retransmitting data in the event of an error, in an alternate embodiment of the invention, the characters in error are flagged, and only those characters in error are replaced as a result of the retransmission. This minimizes the possibility of requiring multiple retransmissions of a single block under conditions of high error rate. The degradation of system performance from that of an error free channel under relatively high error rates ($10^{-5}$) is approximately 3.5%. With error rates in the range of $10^{-6}$ the average character transmission rate is reduced by less than 0.5% from the error free rate.

Suitable display devices may be provided at the transmitter and receiver interface, for displaying the status of the various components of the system.

While the invention has been disclosed and described with reference to a preferred and alternate embodiments, it will be apparent that variations and modifications may be made therein, and it is therefor intended in the following claims to cover each such variation and modification as follows within the true spirit and scope of the invention.

What is claimed is:

1. A remote line printer system for printing data at a remote location comprising:
   (a) a conventional minicomputer having a print port dedicated to driving a local line-by-line printer and at which the bits of each data character and each control character appear in parallel, said conventional minicomputer also having a communications port dedicated to transmitting data to a remote location and at which the bits of a data character to be transmitted appear in series;
   (b) line printer controller means coupled to said print port for receiving data character and control character bits in parallel, said line printer controller means emulating the interface between said conventional minicomputer and a local line-by-line printer;
   (c) character register means coupled to the output of said line printer controller means for storing characters of data;
   (d) block buffer storage means coupled to the output of said character register means for storing a plurality of characters comprising one or more lines of characters to be printed;
   (e) first microprocessor means;
   (f) parallel-to-serial conversion means comprising a circuit controlled by said first microprocessor means coupled to the output of said block buffer storage means and responsive to the parallel bits of data characters for converting the data characters from parallel to serial representation;
   (g) communications means coupled to said parallel-to-serial conversion means and controlled by said first microprocessor means for transmitting character data serially to said remote location;
   (h) data compression means controlled by said first microprocessor means for suppressing trailing blanks and encoding iterations of the same character such that a string of up to 64 characters can be transmitted as a 3-character sequence;
   (i) said first microprocessor means also controlling the encoding and transmission of control status and control signals via said communications means;
   (j) said first microprocessor means also controlling errors by error detection and retransmission to correct errors in character data transmitted by said parallel-to-serial conversion means to said remote location;
   (k) serial-to-parallel conversion means at the remote location coupled to said communications means for converting serial character data to parallel character data; and
   (l) line printer means at the remote location coupled to said serial-to-parallel conversion means for storing the parallel character data and then printing stored characters line by line, said line printer means including error checking means for generating and transmitting, via said communications means, to said parallel-to-serial conversion means a retransmission signal if any character is erroneously received.

2. A remote line printer system for printing data at a remote location according to claim 1 wherein serial data is transmitted synchronously via said communications means.

3. A remote line printer system for printing data at a remote location according to claim 1 further comprising line buffer storage means coupled between said character register means and said parallel-to-serial conversion means and controlled by said first microprocessor means to feed said parallel-to-serial conversion means on a first in first out basis.

4. A remote line printer system for printing data at a remote location according to claim 1 wherein said parallel-to-serial conversion means comprises retransmission control means and serial input/output means.

5. A remote line printer system for printing data at a remote location according to claim 4 wherein serial data is transmitted synchronously via said communications means.

6. A remote line printer system for printing data at a remote location comprising:
   (a) a conventional minicomputer having a print port dedicated to driving a local line-by-line printer and at which the bits of each data character and each control character appear in parallel, said conventional minicomputer also having a communications port dedicated to transmitting data to a remote location and at which the bits of a data character to be transmitted appear in series;
   (b) line printer controller means coupled to said print port for receiving data character and control character bits in parallel, said line printer controller means emulating the interface between said conventional minicomputer and a local line-by-line printer;
   (c) character register means coupled to the output of said line printer controller means for storing characters of data;
   (d) microprocessor means;
   (e) block buffer storage means coupled to the output of said character register means and under the control of said microprocessor means for storing a plurality of characters comprising one or more lines of characters to be printed;
   (f) data compression means under control of said microprocessor means for compressing parallel data stored in said character register means for storage in said block buffer storage means;
   (g) parallel-to-serial conversion means comprising a circuit controlled by said microprocessor means coupled to the output of said block buffer storage means and responsive to the parallel bits of data characters for converting the data characters from parallel to serial representation;
   (h) communications means coupled to said parallel-to-serial conversion means and controlled by said first microprocessor means for transmitting character data serially to said remote location;
   (i) serial-to-parallel conversion means at the remote location coupled to said communications means for converting serial character data to parallel character data; and
   (j) line printer means at the remote location coupled to said serial-to-parallel conversion means for storing the parallel character data and then printing stored characters line by line;
   (k) said line printer means comprising error checking means for generating and transmitting, via said communications means, to said parallel-to-serial conversion means a retransmission signal if any character is erroneously received; and
   (l) said parallel-to-serial conversion means comprising retransmitting means under control of said microprocessor means and responsive to receipt of said retransmission signal for retransmitting via said communications means, to said serial-to-parallel conversion means data stored in said block buffer storage means.

7. A remote line printer system for printing data at a remote location according to claim 6 further comprising at said remote location:
  (m) second microprocessor means;
  (n) said line printer means further comprising decompression means under control of said second microprocessor means and responsive to said error checking means for decompressing error-free data for printing by said line printer means.

8. A remote line printer system for printing data at a remote location according to claim 6 wherein said first microprocessor means also controls errors by redundancy.

* * * * *